United States Patent

Kelly

[15] 3,699,562
[45] Oct. 17, 1972

[54] SAFETY APPARATUS FOR HOT-CHASSIS ELECTRONIC INSTRUMENTS

[72] Inventor: Gordon Emmet Kelly, Indianapolis, Ind.

[73] Assignee: RCA Corporation, New York, N.Y.

[22] Filed: Oct. 9, 1970

[21] Appl. No.: 79,573

[52] U.S. Cl.............340/253 R, 307/127, 324/133, 325/363
[51] Int. Cl. ...................G01r 19/14, G08b 21/00
[58] Field of Search ......340/253, 242; 325/354, 360, 325/363; 324/133; 317/51, 52, 17; 307/127, 138

[56] References Cited

UNITED STATES PATENTS

| 2,870,380 | 1/1959 | Rocha | 317/17 |
| 1,971,711 | 8/1934 | Gaudenzi et al. | 317/51 X |
| 3,431,358 | 3/1969 | Goncharoff | 317/51 X |

FOREIGN PATENTS OR APPLICATIONS 522,133  2/1956  Canada......................324/133

OTHER PUBLICATIONS

Polarity Indicator by Grief; Radio & Television News; November, 1953; page 207

Primary Examiner—John W. Caldwell
Assistant Examiner—Daniel Myer
Attorney—Eugene M. Whitacre

[57] ABSTRACT

A safety indicator for electrical apparatus having a chassis connected to one side of the A.C. power provides a visual or audible indication. The indication is provided by means connected between the chassis and a conductive element electrically isolated from the chassis. When the element is touched by an operator with the plug coacting with the A.C. lines and with the chassis above reference potential due to the coaction, an indication is provided thus producing a warning that the plug has to be reversed.

3 Claims, 4 Drawing Figures

PATENTED OCT 17 1972　　　　　　　　3,699,562

INVENTOR.
Gordon E. Kelly
BY
ATTORNEY

SAFETY APPARATUS FOR HOT-CHASSIS ELECTRONIC INSTRUMENTS

BACKGROUND OF THE INVENTION

This invention relates to safety devices and, more particularly, to a device for determining when a conductive chassis of an electrical apparatus is connected to the earth ground conductor of an A.C. power line.

There exists a number of consumer products as television receivers, radios, tape recorders, and so on, which utilize a conductive chassis as a common conductive return for circuitry employed therein. The chassis which is referred to as chassis ground may be used to support the circuit components.

A power plug associated with the apparatus is adapted to connect to the A.C. power lines; one conductor of which is connected to earth ground. When the one conductor of the power lines is connected through the power plug to the chassis ground, the apparatus is said to have a "hot chassis."

Since the plug is non-polarized, it is possible to insert it into a wall receptacle so that the chassis is not connected to the earth grounded conductor of the A.C. power line.

In this case, the entire chassis of the electrical apparatus is at a high potential with respect to the earth ground. Hence, a person who contacts the metal chassis is subjected to a shock hazard.

Despite the fact that the shock hazard exists, the electrical apparatus functions properly as the voltage supplied across the A.C. lines is still applied between the chassis and the power utilization terminal of the electrical apparatus.

It is therefore desirable to provide means for monitoring the connection between the plug and the A.C. lines to develop a safety indication when the chassis of the apparatus is not connected to the earth ground line because of improper plug insertion.

SUMMARY OF THE INVENTION

In an embodiment of the invention a safety indicator is provided for electrical apparatus of the "hot chassis" type. The apparatus utilizes a conductive member mounted on the electrical apparatus and electrically isolated from the chassis. Means including a sensing device are coupled between the chassis and the conductive member for providing a first indication in response to said member being returned to said reference potential point, with said chassis not at said reference potential point, due to an improper connection of the plug associated with said electrical apparatus when coacting with said A.C. power lines.

For a description of the invention, reference is made to the following specification when read in conjunction with the accompanying drawings in which.

DESCRIPTION OF THE PREFERRED EMBODIMENTS

Figure 1:
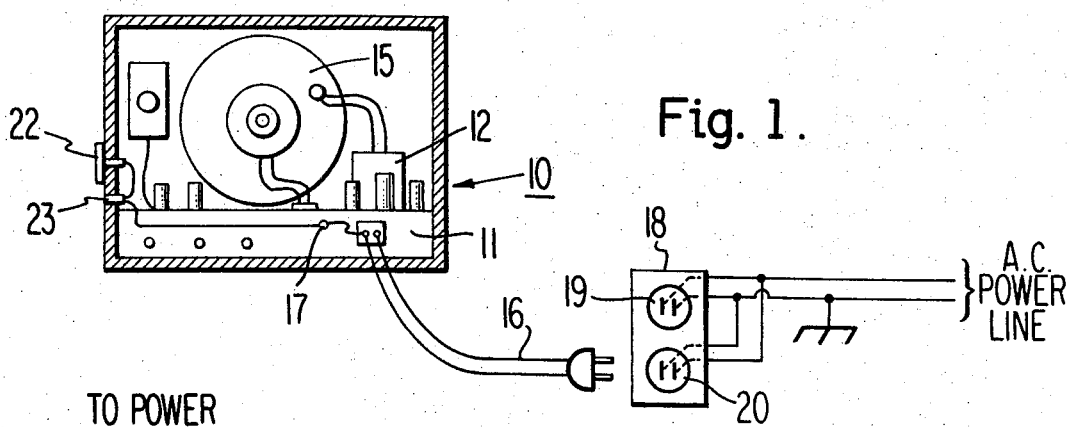
FIG. 1 is a rear plan view of a television receiver employing a hot chassis with safety indicating apparatus according to this invention.

Referring to FIG. 1, there is shown a rear view of a television receiver 10 employing a metal chassis 11. The function of chassis 11 is to support the various components associated with the receiver such as vacuum tubes as 12, the kinescope 15, and so on. For purposes of this invention, the television receiver 10 is of the above-noted hot chassis type. This specifies that chassis 11 is fabricated from a conductive material such as steel or aluminum. Chassis 11 therefore supports the components while further serving the function of providing a ground return path for the power supplies included in the receiver 10.

Conventionally, an A.C. power plug 16 including two conductors is coupled to the television receiver as follows. One terminal of the A.C. power plug is conventionally coupled to power utilization means such as power supply circuits used to energize the various circuits included in the television receiver 10. The other terminal or line of the power plug 16 is connected to the conductive chassis 11, for example, at a ground lug terminal 17. The power plug 16 is then inserted into a wall output 18 normally found in the home and typically having mounted thereon two female receptacles as 19 and 20. Coupled to each terminal of the female receptacles 19 and 20 are respective electrical conductors of the A.C. power lines. In a conventional wiring system for such receptacles as 18, one line of the A.C. power lines is returned to a main ground, also commonly referred to as earth. However, the plug which terminates the power cord 16 is not polarized and therefore one may plug the electrical apparatus or television receiver 10 into the wall receptacle 18 such that the ground side or the chassis is not connected to the respective ground side of the A.C. power lines.

In this manner, the chassis would be placed at a high potential with respect to the main ground of the A.C. power line. Therefore, if a consumer touched the chassis and the main ground line, such as a cold water pipe, and so on, his body would supply a return path from the hot side of the A.C. power line to ground. This could result in a shock because of the return path and therefore cause subsequent injury to the consumer or user of the apparatus. In order to indicate the improper insertion of the plug 16 into the wall receptacle 18, the television receiver 10 includes a conductive plate or element 22 mounted on a suitable surface of the cabinet. The plate or element 22 is electrically isolated from the chassis 11. Coupled between this element and the chassis is an indicator lamp and capacitor assembly designated as 23.

As will be explained subsequently, the function of the conductive plate 22 and the indicator assembly 23 is to provide an indication to the consumer of improper plug insertion. If the plug 16 is improperly inserted when the consumer touches plate 22, his body capacitance forms a return path to ground which causes the indicating assembly 23 to be activated. The activation of the indicator assembly 23 provides an audible or visual warning of improper plug insertion. When such a warning is received, the consumer then proceeds to reverse the polarity of the plug 16 and hence is now assured that the chassis is in fact connected to the earth ground side of the A.C. line. After the plug reversal, if one were to contact the plate 22, the indicating means 23 would not operate, thus assuring the consumer of proper plug insertion.

Figure 2:
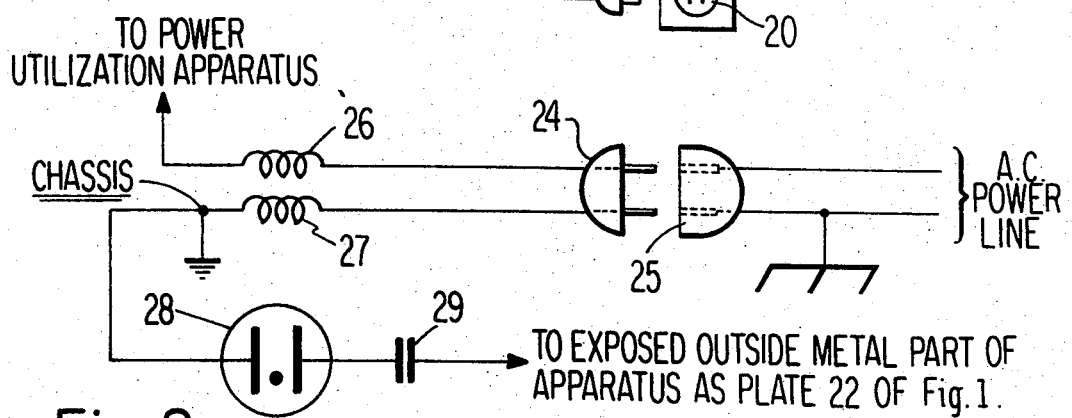
FIG. 2 is a schematic diagram of a safety indicator according to this invention.

FIG. 2 shows a female receptable 25 having two terminals, one of which is connected to the hot side of the A.C. power line and the other of which is connected to the ground side or reference potential side of the A.C. power line. A male connector or plug 24 is shown adjacent thereto and is that plug 16 associated with the electrical apparatus as the television receiver 11 of FIG. 1. One terminal of the male connector 24 is coupled via an inductor 26 to the power utilization apparatus or power supply assembly of a typical electrical apparatus. The other conductor of the plug 24 is coupled through an inductor 27 to the chassis which is shown symbolically at ground potential. Also coupled to the chassis is a terminal of a gas tube 28, which may be a neon tube. The other terminal of the tube 28 is coupled to one electrode of a capacitor 29 having its other electrode coupled to a conductive plate, such as plate 22 of FIG. 1.

The operation of the circuit is as follows. First, assume that the plug 24 is inserted into the receptacle 25 such that the chassis is connected to the hot side or ungrounded side of the A.C. power line. In this case, the chassis would be at a high potential with respect to the main ground or earth potential associated with the grounded side of the A.C. power line. Under these circumstances, a shock hazard exists for the consumer if the consumer directly touched the metal chassis and a main ground return at the same time However, in the circuit shown in FIG. 2, if the consumer first touched the exposed outside metal part of the apparatus as plate 22 of FIG. 1, which is coupled to the capacitor 29; the hot side of the A.C. line would be returned through his body capacitance via the circuit path formed by the gas tube 28 and capacitor 29. The neon tube 28 is selected to have a breakdown voltage less than the magnitude of voltage across the A.C. lines. The capacitor 29 is a relatively small value when compared to the capacitance afforded by a typical human body.

Accordingly, when a person places his hand near the metal plate, his body capacitance provides a return path to ground. This causes the hot potential at the chassis side of the apparatus to produce a small current flow determined by the impedance of the lamp 28, the capacitor 29, and the body capacitance. The major portion of the line voltage is directed across the neon 28, which lights. Due to the fact that the neon 28 can be seen from the outside of the apparatus as shown in FIG. 1, the neon produces a visual indication to the consumer that the polarity of the plug as coacting with the A.C. line is wrong and hence reversal is in order. With the plug 23 properly coacting with the receptacle 25, the chassis would be at earth ground potential; and hence, when the plate is touched as above, there will be no voltage developed and no current flow. In this condition, the neon 28 will remain off indicating proper polarity.

Figure 3:
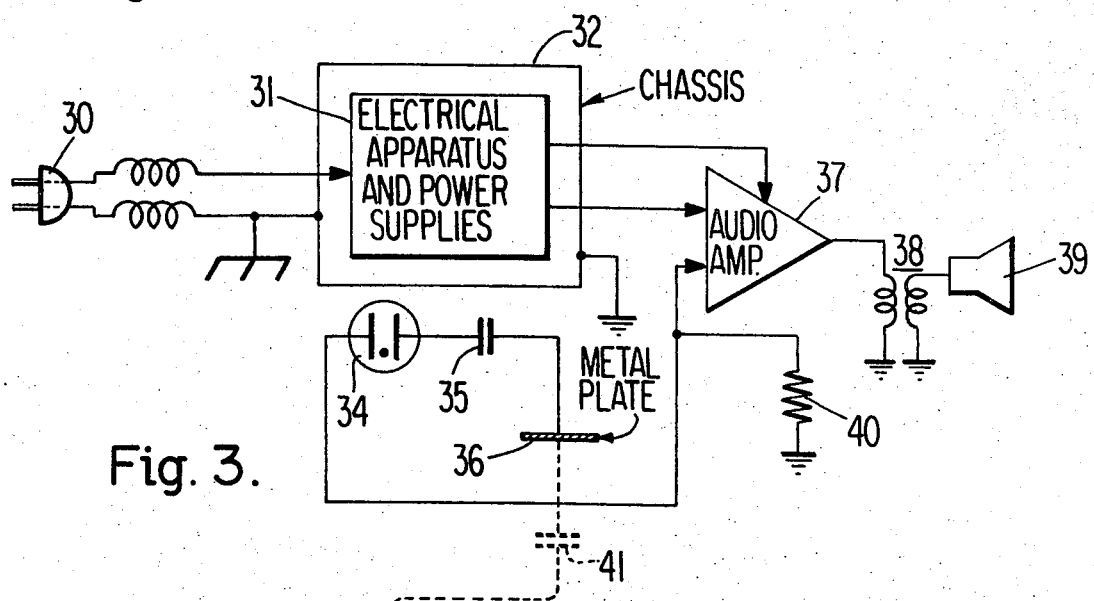
FIG. 3 is a schematic diagram partially in block form of an alternate embodiment.

Referring to FIG. 3, there is again shown a male connector 30 which has one terminal coupled to the power supply section of an electrical apparatus 31 and the other terminal connected to a hot chassis 32 associated with the electrical apparatus 31. A neon bulb 34 is in series with a capacitor 35, having one terminal thereof connected to a metal plate 36. Plate 36 is electrically isolated from the chassis 32. The circuit shown in FIG. 3 is similar to the circuit in FIG. 2 with the exception that one terminal of the neon 34 is coupled to an input electrode of an audio amplifier 37, which is conveniently present in the above-described electrical apparatus. The input is conventionally returned to chassis ground via a resistor 40. For example, it is well known that apparatus such as hi-fi and stereo equipment as well as the television receiver possess audio amplifier stages. The audio amplifier 37 has its output electrode coupled to the primary winding of an audio transformer 38, which has a secondary winding coupled to a loud speaker 39. Speaker 39 serves to convert the electrical variations produced by the audio amplifying equipment into sound. The operation of the circuit described in FIG. 3 is similar to the operation of the circuitry described in FIG. 2 with the exception that, if a person contacts the metal plate 36 and affords the ground return path via his body capacitance, the neon 34 ignites producing a visual indication. Furthermore, due to the voltage change at the junction between neon 34 and capacitor 35, an audible sound is produced via the loud speaker because of the connection to the input of the audio amplifier 37. The current path shown in FIG. 3 is via the resistor 40 having one terminal at chassis ground which, because of the improper plug connection, is not at earth potential. Upon hearing this audible sound produced in the audio section, the consumer then has another indication that the polarity of the plug connection is incorrect and hence a reversal is in order.

Figure 4:
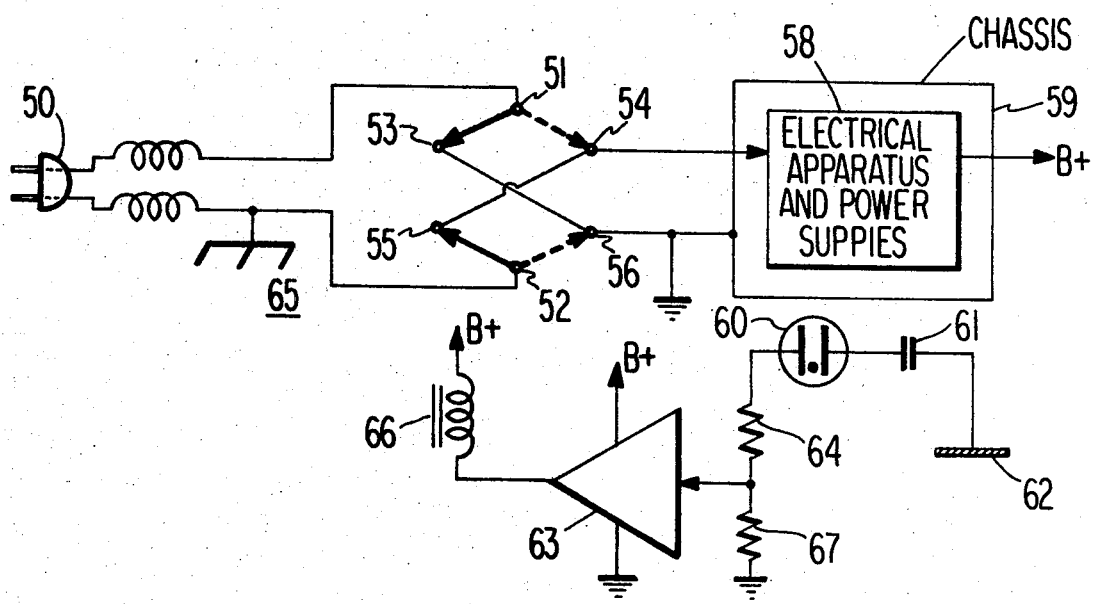
FIG. 4 is a schematic diagram partially in block form of a safety indicator employing an automatic switchover circuit according to this invention.

Referring to FIG. 4, there is shown a safety indicator apparatus according to the invention utilizing an automatic switch-over circuit which will automatically reverse the polarity of the power line when a conductive plate is touched. A power plug 50 associated with electrical apparatus has two terminals thereof. Each terminal is connected to a separate contact as 51 and 52 of a double pole, double throw relay 65. The relay 65 has a moveable arm associated with each contact 51 and 52. The moveable arm can connect the contact 51 to contact 53 or 54, whereas the other moveable arm can connect the contact 52 to either contact 55 or 56. Contacts 54 and 55 are connected together as are contacts 53 and 56. As indicated, the contact 54 is also coupled to the power supply section of a suitable electrical apparatus 58 and the contact 56 is connected to the chassis 59 associated with the electrical apparatus 58. A gas tube indicating device 60 is in series with a capacitor 61, which has one terminal connected to a metal plate 62. Plate 62 is electrically isolated from the "hot chassis" 59. In the circuit shown the neon 60 in series with capacitor 61 and plate 62 has one terminal coupled to the input electrode of an amplifier 63 via a resistor 64. The amplifier is of a conventional type and receives operating potential from the power supplies associated with the electrical apparatus 58 and generally designated as B+. An input electrode return for the amplifier is provided by resistor 67 having one terminal connected to the input electrode and another terminal connected to chassis ground. The output of the amplifier 63 is coupled to B+ via a relay coil 66 associated with the above-described relay 65 and the relay contacts 51–56.

The operation of the circuit is as follows. If the plug 50 is improperly coacting with an A.C. wall receptacle, the chassis will not be at earth ground potential as described above. Therefore, if one contacts the metal plate 62, his body impedance provides a return path to earth ground, which in turn causes a current to flow through the circuit sufficient to ignite the neon 60 and to cause a current to flow into the input electrode of amplifier 63. The amplifier 63 turns on, thus causing a current to flow through the relay coil 65, which in turn causes the relay to energize. This energization of the relay causes the moveable arms shown in solid configuration to transfer to the positions shown in dashed lines. This action reverses the line connection, as seen, and causes the lines associated with plug 50 to reverse polarity, thus placing the chassis 59 of the electrical apparatus 58 at earth ground potential. The relay 65 including the coil 66 may be of a mechanical latch type, and hence after energization the relay 65 will conventionally remain in the last position. The above-described circuit, therefore, provides an automatic reversal of plug polarity for an improper connection, as indicated above, of the plug 50 to a suitable A.C. wall receptacle.

The metal plate 62 may be located near the on-off switch, not shown, but conventionally included with electrical apparatus. Accordingly, as a person seeks to energize the apparatus via this switch, his hand being near or touching plate 62 will provide the ground return path via his body to cause the relay to energize and automatically switch connections for improper plug insertion.

What is claimed is:

1. A safety indicator for use with electrical apparatus of the type employing an electrically conductive chassis which is to be desirably connected to a point of reference potential at a predetermined terminal of A.C. power lines via a plug having one terminal thereof connected to said chassis, said A.C. power lines serving to energize said apparatus when said plug is coacting therewith, comprising:
    a. a conductive member mounted on said electrical apparatus and electrically isolated from said chassis;
    b. an amplifier having an input terminal and an output terminal;
    c. means including a gas tube coupled between said member and said input terminal, said gas tube being conductive to provide an active indication in response to said member being returned to said reference potential point when said plug is connected to said power lines so that said chassis is not connected to said reference potential terminal of said A.C. power lines, and being nonconductive when said plug is connected to said power lines so that said chassis is at said reference potential point; and switching means coupled to said output terminal for automatically reversing the connections of said plug and said electrical apparatus to connect said chassis at said reference potential terminal of said A.C. power lines when said gas tube is conductive.

2. In an electrical apparatus of the type adapted to be plugged into and energized from A.C. power lines having at least two terminals, said apparatus including an electrically conductive chassis which is desirably connected to a point of reference potential at a predetermined terminal of said power lines, in combination therewith:

safety apparatus for indicating when said electrical apparatus is properly plugged into said A.C. lines by determining when said chassis of said electrical apparatus is properly connected to said reference potential terminal of said A.C. power line, comprising:
    a. a conductive element mounted on said electrical apparatus and electrically isolated from said chassis;
    b. an amplifier having an input terminal and an output terminal;
    c. means coupled between said conductive element and said chassis, said means including a breakdown device having a breakdown potential rating less than the magnitude of potential on said A.C. lines connected in a circuit path between said conductive element and said input terminal of said amplifier, to develop a control signal at said input terminal of said amplifier when a circuit path is provided between said conductive element and said reference potential terminal, said control signal being determinative of said chassis being improperly plugged into said A.C. power lines; and
    d. switching means for connection of said A.C. lines to said electrical apparatus, said switching apparatus reversing its said connection in response to amplified control signals provided at said output terminal of said amplifier in response to said control signal.

3. Safety apparatus for use with electrical apparatus of the type employing an electrically conductive chassis, said chassis utilized as a ground return for said apparatus and which is to be desirably connected to a point of reference potential available at one of two terminals associated with A.C. power lines, said A.C. power lines serving to energize said apparatus via a plug associated with said electrical apparatus for coacting with said A.C. power lines, said plug having one terminal connected to said chassis and another terminal connected to said electrical apparatus whereby said plug may undesirably coact with said A.C. power lines to cause said chassis to be connected with the terminal of said power lines not at reference potential, thus presenting a shock hazard to a consumer, said safety apparatus comprising:
    a. a conductive element mounted on said electrical apparatus and electrically isolated from said chassis;
    b. an amplifier having an input terminal, an output terminal, and a reference terminal connected to said chassis;
    c. first means coupled between said chassis and said conductive element, said means including a gas tube connected in a circuit path between said conductive element and said input terminal of said amplifier, said gas tube being rendered conductive when said element is returned to reference potential with said plug coacting with said A.C. power lines and with said chassis not at reference potential, and d. a loudspeaker arranged to be energized from said output terminal of said amplifier, whereby when a consumer or other operator touches said element his body impedance provides said reference potential return for said element, thereby causing said gas tube to glow and said loudspeaker to be energized.

* * * * *